US009336428B2

(12) United States Patent
Erhart

(10) Patent No.: US 9,336,428 B2
(45) Date of Patent: May 10, 2016

(54) INTEGRATED FINGERPRINT SENSOR AND DISPLAY

(75) Inventor: Richard Alex Erhart, Tempe, AZ (US)

(73) Assignee: Synaptics Incorporated, San Jose, CA (US)

( * ) Notice: Subject to any disclaimer, the term of this patent is extended or adjusted under 35 U.S.C. 154(b) by 529 days.

(21) Appl. No.: 12/914,812

(22) Filed: Oct. 28, 2010

(65) Prior Publication Data

US 2011/0102567 A1    May 5, 2011

Related U.S. Application Data

(60) Provisional application No. 61/256,908, filed on Oct. 30, 2009.

(51) Int. Cl.
*H04N 9/47*     (2006.01)
*H04N 7/18*     (2006.01)
*G06K 9/00*     (2006.01)
*G02F 1/133*    (2006.01)

(52) U.S. Cl.
CPC ........ *G06K 9/00053* (2013.01); *G06K 9/00026* (2013.01); *G02F 2001/13312* (2013.01)

(58) Field of Classification Search
CPC .......... G06K 9/00013; G06K 9/00006; G06K 9/0002; G06K 9/0004; G06K 9/00026; G06K 9/00067; G06K 9/00087; G06F 21/32; G06F 2203/0338; G06F 3/03547; G06F 3/0304
USPC ................................................... 348/77, 161
See application file for complete search history.

(56) References Cited

U.S. PATENT DOCUMENTS

| | | |
|---|---|---|
| 4,151,512 A | 4/1979 | Rigannati et al. |
| 4,225,850 A | 9/1980 | Chang et al. |
| 4,310,827 A | 1/1982 | Asai |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Lofberg |
| 4,675,544 A | 6/1987 | Schrenk |

(Continued)

FOREIGN PATENT DOCUMENTS

| | | |
|---|---|---|
| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Andy Rao
*Assistant Examiner* — Jared Walker
(74) *Attorney, Agent, or Firm* — Leydig, Voit & Mayer, Ltd

(57) ABSTRACT

A fingerprint swipe sensor includes fingerprint sensor lines disposed on a surface of an LCD protective glass covered on an opposite surface with motion sensing lines. The fingerprint swipe sensor also includes a controller coupled to the fingerprint sensor lines to capture a fingerprint image when a user's finger is swiped about the fingerprint sensor lines.

25 Claims, 9 Drawing Sheets

(56) References Cited

U.S. PATENT DOCUMENTS

| | | |
|---|---|---|
| 4,758,622 A | 7/1988 | Gosselin |
| 4,817,183 A | 3/1989 | Sparrow |
| 5,076,566 A | 12/1991 | Kriegel |
| 5,109,427 A | 4/1992 | Yang |
| 5,140,642 A | 8/1992 | Hau et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,838,306 A | 11/1998 | O'Connor |
| 5,848,176 A | 12/1998 | Harra et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,956,415 A | 9/1999 | McCalley et al. |
| 5,963,679 A | 10/1999 | Setlak |
| 5,995,630 A | 11/1999 | Borza |
| 5,999,637 A | 12/1999 | Toyoda et al. |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,259,108 B1 | 7/2001 | Antonelli et al. |
| 6,289,114 B1 | 9/2001 | Mainguet |
| 6,292,272 B1 | 9/2001 | Okauchi et al. |
| 6,307,258 B1 | 10/2001 | Crane, Jr. et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,332,193 B1 | 12/2001 | Glass et al. |
| 6,333,989 B1 | 12/2001 | Borza |
| 6,337,919 B1 | 1/2002 | Duton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,401,551 B1 | 6/2002 | Seiko |
| 6,408,087 B1 | 6/2002 | Kramer |
| 6,473,072 B1 | 10/2002 | Comiskey et al. |
| 6,509,501 B2 | 1/2003 | Eicken et al. |
| 6,512,381 B2 | 1/2003 | Kramer |
| 6,525,547 B2 | 2/2003 | Hayes |
| 6,525,932 B1 | 2/2003 | Ohnishi et al. |
| 6,539,101 B1 | 3/2003 | Black |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,416 B1 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Wong |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |

(56) References Cited

U.S. PATENT DOCUMENTS

| | | | |
|---|---|---|---|
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,697 B2 | 12/2008 | Erhart |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,826,645 B1 | 11/2010 | Cayen |
| 7,843,438 B2 | 11/2010 | Onoda |
| 7,848,798 B2 | 12/2010 | Martinsen et al. |
| 7,899,216 B2 | 3/2011 | Watanabe et al. |
| 7,953,258 B2 | 5/2011 | Dean et al. |
| 8,031,916 B2 | 10/2011 | Abiko et al. |
| 8,063,734 B2 | 11/2011 | Conforti |
| 8,077,935 B2 | 12/2011 | Geoffroy et al. |
| 8,107,212 B2 | 1/2012 | Nelson et al. |
| 8,116,540 B2 | 2/2012 | Lewis et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 8,276,816 B2 | 10/2012 | Gardner |
| 8,278,946 B2 | 10/2012 | Thompson |
| 8,290,150 B2 | 10/2012 | Erhart et al. |
| 8,315,444 B2 | 11/2012 | Gardner |
| 8,331,096 B2 | 12/2012 | Garcia |
| 8,335,353 B2 | 12/2012 | Yamamoto et al. |
| 8,358,815 B2 | 1/2013 | Benkley et al. |
| 8,374,407 B2 | 2/2013 | Benkley et al. |
| 8,391,568 B2 | 3/2013 | Satyan |
| 2001/0026636 A1 | 10/2001 | Mainget |
| 2001/0030644 A1 | 10/2001 | Allport |
| 2001/0033275 A1 | 10/2001 | Kent et al. |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0174348 A1 | 11/2002 | Ting |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen et al. |
| 2003/0169228 A1 | 9/2003 | Mathiassen et al. |
| 2003/0174256 A1 | 9/2003 | Kim et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0101171 A1 | 5/2004 | Lane et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1* | 12/2004 | Lan et al. ............... 382/124 |
| 2005/0030724 A1 | 2/2005 | Ryhanen et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0093834 A1 | 5/2005 | Abdallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0017862 A1* | 1/2006 | Song et al. ............... 349/42 |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0097991 A1 | 5/2006 | Hotelling et al. |

(56) References Cited

U.S. PATENT DOCUMENTS

| | | |
|---|---|---|
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0181521 A1 | 8/2006 | Perrault et al. |
| 2006/0182319 A1 | 8/2006 | Setlank et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0038867 A1 | 2/2007 | Verbauwhede et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086630 A1 | 4/2007 | Setlak et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0253607 A1 | 11/2007 | Higuchi |
| 2007/0290124 A1 | 12/2007 | Neil et al. |
| 2008/0002867 A1 | 1/2008 | Mathiassen et al. |
| 2008/0006453 A1 | 1/2008 | Hotelling |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0083850 A1 | 3/2009 | Fadell et al. |
| 2009/0130369 A1 | 5/2009 | Huang et al. |
| 2009/0146970 A1 | 6/2009 | Lowles et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0256825 A1 | 10/2009 | Klinghult et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0097080 A1 | 4/2010 | Kobayashi et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0083018 A1 | 4/2011 | Kesanupalli et al. |
| 2011/0083170 A1 | 4/2011 | Kesanupalli et al. |
| 2011/0090047 A1 | 4/2011 | Patel |
| 2011/0102567 A1 | 5/2011 | Erhart |
| 2011/0102569 A1 | 5/2011 | Erhart |
| 2011/0165393 A1 | 7/2011 | Bayne et al. |
| 2011/0175703 A1 | 7/2011 | Benkley |
| 2011/0176307 A1 | 7/2011 | Benkley |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0044639 A1 | 2/2012 | Garcia |
| 2012/0189166 A1 | 7/2012 | Russo |
| 2012/0189172 A1 | 7/2012 | Russo |
| 2012/0206586 A1 | 8/2012 | Gardner |
| 2012/0242635 A1 | 9/2012 | Erhart et al. |
| 2012/0256280 A1 | 10/2012 | Erhart |
| 2012/0257032 A1 | 10/2012 | Benkley |
| 2012/0308092 A1 | 12/2012 | Benkley et al. |
| 2013/0004695 A1 | 1/2013 | Kim et al. |
| 2013/0021044 A1 | 1/2013 | Thompson et al. |
| 2013/0108124 A1 | 5/2013 | Wickboldt et al. |
| 2013/0169590 A1 | 7/2013 | Wickboldt et al. |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2490593 | 11/2012 |
| GB | 2474999 B | 2/2013 |
| GB | 2496055 A | 5/2013 |

(56) References Cited

FOREIGN PATENT DOCUMENTS

| | | |
|---|---|---|
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| JP | 2010/103240 A | 6/2010 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| TW | 200828131 A | 7/2008 |
| TW | 200928922 A | 7/2009 |
| TW | I315852 B | 10/2009 |
| TW | I328776 B | 8/2010 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/61668 A1 | 8/2002 |
| WO | WO 02/077907 A1 | 10/2002 |
| WO | WO 02/093239 A1 | 11/2002 |
| WO | WO 02/099520 A1 | 12/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/088248 A1 | 1/2011 |
| WO | WO/2011/088252 A1 | 1/2011 |
| WO | WO 2011/053797 A1 | 5/2011 |
| WO | WO 2011/126262 A2 | 10/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Bellagiodesigns.com (Inernet Archive Wayback Machine, www.bellagiodesigns.com date: Oct. 29, 2005).

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006, http://en.widipedia.org/wiki/Integrated_circuit.

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

U.S. Appl. No. 12/916,000, filed Oct. 29, 2010.
U.S. Appl. No. 13/099,983, filed May 3, 2011.
U.S. Appl. No. 13/454,432, filed Apr. 24, 2012.

* cited by examiner

INTEGRATED FINGERPRINT SENSOR AND DISPLAY

RELATED APPLICATIONS

This application claims the benefit of U.S. Provisional Application No. 61/256,908, filed Oct. 30, 2009, the disclosure of which is incorporated by reference herein.

BACKGROUND

Since its inception, fingerprint sensing technology has revolutionized identification and authentication processes. In most cases, a single fingerprint can be used to uniquely identify an individual in a manner that cannot be easily replicated or imitated. The ability to capture and store fingerprint image data in a digital file of minimal size has yielded immense benefits in fields such as law enforcement, forensics, and information security.

However, the widespread adoption of fingerprint sensing technology in a broad range of applications has faced a number of obstacles. Among these obstacles is the need for a separate and distinct apparatus for capturing a fingerprint image, which most consumer-grade computer systems do not contain. Incorporating a distinct component whose only function is to capture fingerprint image data into an otherwise multi-functional computer system is often not economical for consumers or computer manufacturers. Although low-cost fingerprint sensing devices do exist, consumers are often reluctant to purchase a separate accessory with such a limited application. Consequently, computer manufacturers typically do not incorporate such accessories as built-in components.

Additionally, such components are often impractical for use in systems that are designed to be of minimal size or weight. As handheld devices begin to take on a greater range of functionality and more widespread use, engineers and designers of such devices are constantly seeking ways to maximize sophistication and ease of use while minimizing size and cost. Typically, such devices only incorporate input/output components that are deemed to be essential to core functionality, e.g., a screen, a keyboard, and a limited set of buttons.

For these reasons, fingerprint-based authentication techniques have not replaced username and password authentication in the most common information security applications such as email, online banking, and social networking. Paradoxically, the growing amount of sensitive information Internet users are entrusting to remote computer systems has intensified the need for authentication procedures more reliable than password-based techniques.

The advent and widespread adoption of LCD (Liquid Crystal Display) technology provides an opportunity to address this need. LCD technology provides a low-cost and versatile means of incorporating both input and output functionality into a single discrete component. Touch-screen technology, which typically comprises a special layer within the LCD panel apparatus, enables system output to be displayed and user input to be taken on the same surface. LCD technology has replaced cathode ray tube (CRT) displays in virtually all computer systems due to its lower power consumption and physical space requirements. Additionally, the declining cost and increasing sophistication of LCD touch-screen displays have contributed to the growing popularity of handheld computing devices incorporating such displays.

An LCD display with built-in fingerprint sensing capability would thus lead to more widespread adoption of fingerprint-based authentication. However, one problem with simply integrating existing fingerprint sensing technology into LCD touch screens is hardware incompatibility. Most fingerprint sensors require a silicon circuit on which to mount the fingerprint sensing components, whether they are resistive, capacitive, thermal, or optical. Incorporating such a circuit into an LCD display would require significant and costly modifications to the design and production processes of such displays. However, a fingerprint sensing system comprising a mechanism and components that can easily be incorporated into existing LCD displays addresses this problem.

As will be seen, the present invention provides such a system in an elegant manner.

BRIEF DESCRIPTION OF THE DRAWINGS

Throughout the description, similar reference numbers may be used to identify similar elements.

DETAILED DESCRIPTION

Figure 1:
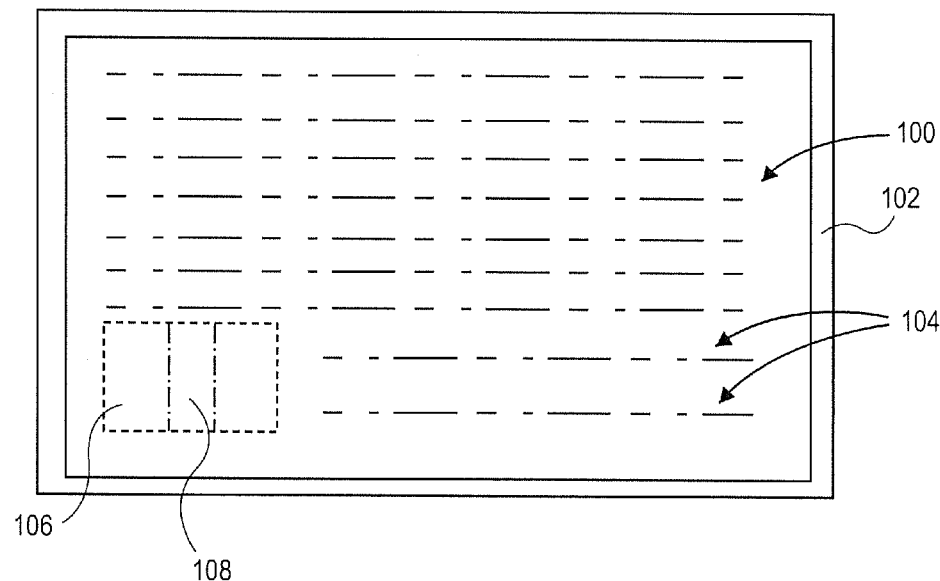
FIG. 1 illustrates an example LCD display device having touch screen circuitry and a fingerprint sensor.

The present invention is directed to a novel fingerprint sensor that can be integrated into the touch-screen layer of an LCD display, or onto the LCD glass itself. In addition, the sensing elements could be used to replace the touch-screen controller chip and provide a single chip solution that provides both touch-screen functions and fingerprint sensor functions.

In particular, the invention is directed to a device, system and method for integrating a fingerprint sensor with a display screen, such as an LCD screen. The figures illustrate diagrammatic views of various examples of components configured according to the invention. These components, which include fingerprint sensor components and various subcomponents and structures for integration into an LCD screen or the like, are intended for incorporation into devices or systems. The invention would benefit these devices or systems by enabling them to provide fingerprint sensing capability.

Reference will be made herein to a fingerprint sensor and related circuitry that may be implemented on Kapton® tape, a well known substrate for placing or printing electrical components thereon. Reference is made here of U.S. Pat. No. 7,460,697 B2 issued Dec. 2, 2008, entitled "Electronic Fingerprint Sensor with Differential Noise Cancellation," and U.S. Pat. No. 7,099,496 B2 issued Aug. 29, 2006, entitled "Swiped Aperture Capacitive Fingerprint Sensing Systems and Methods." This application also incorporates the following by reference: U.S. Pat. No. 7,146,024 B2 issued Dec. 5, 2006, entitled "Swiped Aperture Capacitive Fingerprint Sensing Systems and Methods," and U.S. Pat. No. 7,463,756 B2 issued Dec. 9, 2008, entitled "Fingerprint Position Sensing Methods and Apparatus." This application also incorporates the following by reference: U.S. Pat. No. 6,400,836 B2 issued Jun. 4, 2002, entitled "Combined Fingerprint Acquisition and Control Device", and U.S. Pat. No. 6,941,00 B1 issued Sep. 6, 2005, entitled "Combined Fingerprint Acquisition and Control Device." These references are commonly assigned with this application, where such a sensor configuration and design are detailed. All details of these applications and issued patents are herein incorporated by reference.

The embodiments discussed herein generally relate to an apparatus, system and methods for configuring fingerprint sensors and, in particular, for integrating fingerprint sensors into LCD circuits and displays. Referring to the figures, exemplary embodiments will be described. The exemplary embodiments of the invention are provided to illustrate the embodiments and should not be construed as limiting the scope of the embodiments.

In the following disclosure, numerous specific details are set forth to provide a thorough understanding of the invention. However, those skilled in the art will appreciate that the invention may be practiced without such specific details. In other instances, well-known elements have been illustrated in schematic or block diagram form in order not to obscure the invention in unnecessary detail. Additionally, for the most part, details concerning network communications, data structures, and the like have been omitted inasmuch as such details are not considered necessary to obtain a complete understanding of the invention, and are considered to be within the understanding of persons of ordinary skill in the relevant art.

It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including", "comprising", and "incorporating" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The apparatus and method include a method and apparatus for enabling the invention. Although this embodiment is described and illustrated in the context of devices, systems and related methods of capturing fingerprints, the scope of the invention extends to other applications where such functions are useful. Furthermore, while the foregoing description has been with reference to particular embodiments of the invention, it will be appreciated that these are only illustrative of the invention and that changes may be made to those embodiments without departing from the principles, the spirit and scope of the invention, the scope of which is defined by the appended claims, their equivalents, and also later submitted claims and their equivalents.

As described in the background, the integration of most fingerprint sensor designs into an LCD screen is problematic due to the difficulty of incorporating a silicon-based sensor into an LCD display. According to the invention, this problem is obviated with a novel design that requires only conductive metal lines to form the fingerprint sensor. This mechanism may also be used to replace the touch-screen function. The invention works with current touch-screen and LCD manufacturing techniques, where fingerprint sensor conductive components may be sandwiched between layers of the LCD components and functionally integrated or included on the same metal layers as the current touch-screen (which typically consist of indium tin oxide (ITO)). This provides an LCD panel with the added functionality of a fingerprint sensor without disrupting the operation of the visual display components. In addition, current LCD manufacturing techniques can easily be adapted to produce an LCD panel designed and configured according to the invention.

Consistent with the foregoing, disclosed herein is a fingerprint swipe sensor, comprising a substrate having fingerprint sensor lines on one surface and configured to be integrated with an LCD screen, and a controller communicating with the fingerprint sensor lines to capture a fingerprint image when a user's finger is swiped about the fingerprint sensor lines. In one embodiment, the substrate may be a protective coating configured to hold touch screen circuitry together with the fingerprint sensor lines, such that the protective coating can be mounted on an LCD screen together with the touch screen circuitry and the fingerprint sensor lines. In another embodiment, the substrate may be configured to be mounted on a protective coating holding touch screen circuitry, such that the protective coating can be mounted on an LCD screen together with the touch screen circuitry and the substrate.

Also disclosed is an LCD screen having an integrated fingerprint swipe sensor, comprising an LCD surface configured to produce a visible display, a substrate having fingerprint sensor lines on one surface and configured to be integrated with the LCD screen to allow the integrated fingerprint sensor lines to capture a fingerprint image without interfering with the visibility of the visible display, and a controller communicating with the fingerprint sensor lines to capture a fingerprint image when a user's fingerprint is swiped about the fingerprint sensor lines. In one embodiment, the controller may be further configured to control the visible display. In another embodiment, the LCD screen may further comprise an additional controller configured to control the visible display. In yet another embodiment, the LCD screen may further comprise touch screen circuitry integrated with the fingerprint sensor lines.

As will be seen, the invention provides a minimally invasive mechanism to integrate the fingerprint sensor in an LCD among the layers of components that are conventionally used in assembling touch-screen layers on LCD displays, or directly onto the LCD display itself. This can be done under a protective covering that is placed over an LCD screen, and may or may not include touch sensitive circuitry in the sandwiched layers, depending on the application. The examples and embodiments described herein include illustrations and references to touch sensitive circuitry, both capacitive and resistive, and also refer to fingerprint sensor circuitry that may also be capacitive or resistive, but the invention is not limited to any particular configuration or underlying technology in these areas. The invention is only limited by the appended claims, claims presented in the future, and any equivalents.

In current touch screen designs, there typically exists an LCD printed circuit board (PCB) on which the touch screen circuitry is mounted, and a protective shield or coating is applied on top of the touch screen circuitry. The touch screen circuitry is connected with the LCD display on the LCD PCB (Printed Circuit Board) by one of two methods. In one method, the touch screen circuitry is first mounted on the LCD PCB, then the protective shield or coating is applied on top of the touch screen circuitry. In another method, the touch screen circuitry is applied onto the protective coating or shield, and then the resulting structure is mounted on the LCD PCB, with the touch screen circuitry mounted between the protective coating or shield and the LCD PCB. According to the invention, the substrate of the fingerprint sensor can be integrated with either of these methods.

In the following figures, several examples of devices or systems configured according to the invention are illustrated.

Referring to FIG. 1, a diagrammatic view of an LCD panel 100 having a printed circuit board (PCB) 102 for holding LCD components to provide a display. LCD panel 100 also includes optional touch screen circuitry 104 and an integrated fingerprint sensor 106 with a swiping area 108 for capturing a fingerprint from a user. Such a device can be manufactured in a number of ways and, given this disclosure, one skilled in the art will find it feasible to design and produce such a device without undue experimentation. LCD panel 100 may be utilized in a variety of devices, such as a computing device, cellular phone, portable entertainment device, tablet device, and so forth. The disclosed fingerprint sensors 106, 206, 304, 410, 506, 606, 706 and 804 as shown in FIGS. 1, 2, 3, 4, 5, 6, 7 and 8 may include a fingerprint image sensor, which may include an array of capacitive sensors for capacitive sensing of ridge peaks and ridge valleys of a fingerprint on a swiped finger. The fingerprint image sensors 106, 206, 304, 410, 506, 606, 706 and 804 may include a linear array of capacitive sensors for capacitive sensing of ridge peaks and ridge valleys of a fingerprint. The image sensors may also include at least one image pickup trace and at least one image drive trace in spaced relation to the at least one image pickup trace to each define respectively one of a plurality of sensor gaps/image pixel locations, between a respective image drive plate and a respective image pickup plate. The ridge peaks and ridge valleys of the fingerprint over the sensor gaps/image pixel locations can produce a change in capacitance between the respective image drive trace and the respective image pickup trace. The conductive elements/traces may thus create a capacitive sensing array for detecting topographic variations in an object, such as a finger. The array may include multiple drive traces which can be sequentially excited with short duration electronic waveform bursts. A pickup plate connected to a sensing circuit can sequentially detect/receive the intensity of the electric field created by a respective drive trace. With each complete scan of the pixel locations formed by the drive/pickup trace gaps a two-dimensional image based on variation of capacitance across the respective gaps can be generated, including a resemblance of features of the physical surface of the object. In some embodiments, the sensor drive traces can comprise parallel traces/conductors disposed perpendicular to a single image pickup trace and spaced from the image pickup trace by respective sensor gaps. In some embodiments, two or more image pickup traces can be utilized. The image pickup trace(s) and the image drive trace(s) may be substantially coplanar in the fingerprint sensors 106, 206, 304, 410, 506, 606, 706 and 804. Features of the finger passing above the sensor gaps so created in the sensor array 106, 206, 304, 410, 506, 606, 706 and 804 can produce changes in capacitance between each respective image drive trace(s) and a respective image pickup trace(s). The image sensing apparatus, e.g., a controller IC (950 as shown in FIG. 9 may further comprise an excitation circuit for sequentially energizing the respective image drive trace(s) with image drive signals and a detection circuit for detecting the drive signals capacitively coupled, i.e., received from the respective image drive trace(s) by the respective image pickup trace(s), across the respective gap, to provide image signals. Therefore the fingerprint images sensors 106, 206, 304, 410, 506, 606, 706 and 804 can form capacitive gap sensor arrays for detecting topographic variations of an object over the array. The sensor arrays having the described sensor gaps, i.e., sensor apertures can sense topographic variations in the object, e.g., over or passing over the respective sensor gap/aperture, e.g. in the sensing area 108, because the capacitance of the capacitive gap/aperture changes and can be measured to reconstruct an image of the biometric being sensed, e.g., a fingerprint.

Figure 2:
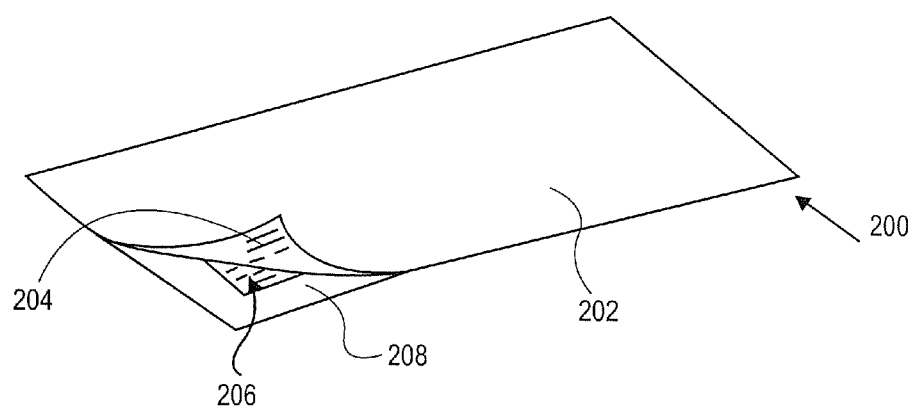
FIG. 2 illustrates an example portion of an LCD display device having touch screen circuitry and a fingerprint sensor.

Referring to FIG. 2, a side diagrammatic view of a device 200 is illustrated with a top coating or layer 202 having touch sensor circuitry 204 located on an inside portion of top coating/layer 202. A fingerprint sensor 206, made up of a thin circuitry layer described in further detail below, is shown with a layer peeled back to illustrate the fingerprint sensor integrated between top layer 202 and the LCD's PCB 208.

Figure 3:
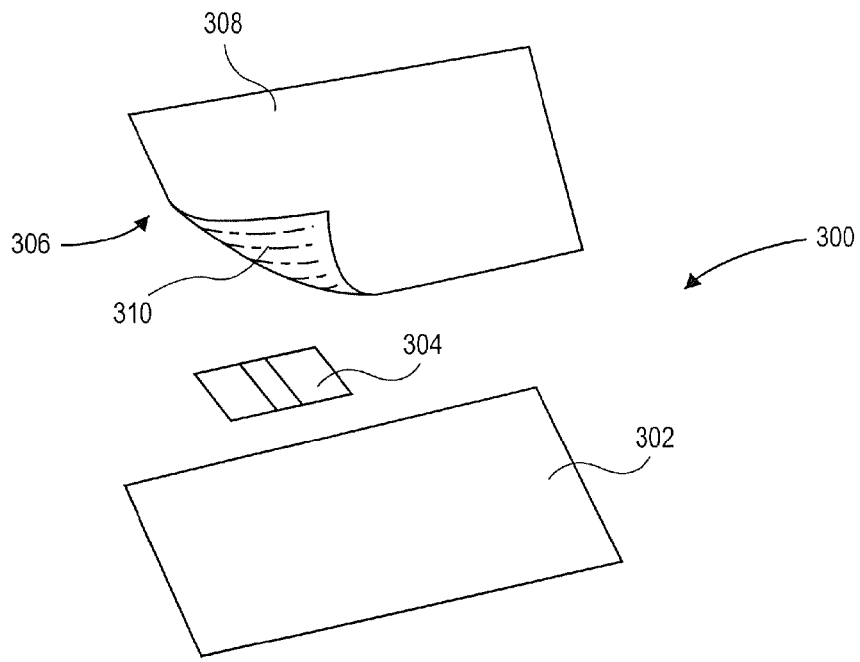
FIG. 3 illustrates an exploded view of an example LCD display device.

FIG. 3 illustrates an exploded view of an assembly 300, including an LCD PCB 302 and a fingerprint sensor 304. In this example, fingerprint sensor 304 is positioned between a protective layer or coating 306 having a top layer 308 that may be exposed to a user in a touch pad enabled device and LCD PCB 302. Touch sensitive circuitry 310 is located on a bottom layer of protective coating 306 to be assembled over fingerprint sensor 304 and LCD PCB 302. In conventional assemblies, touch sensitive circuitry 310 may be adhered to or otherwise placed on the bottom side of layer or coating 308 prior to assembly, and then placed or otherwise mounted on top of LCD PCB 302 during final assembly. In other assembly methods, touch sensitive circuitry 310 may be assembled directly onto LCD PCB 302 first, then the next layer placed on top of the LCD PCB having the touch sensitive circuitry already mounted thereon. Fingerprint sensor 304 may be either on the same layer as touch sensitive circuitry 310, or on a layer above it, closer to the finger. In an alternate embodiment, fingerprint sensor 304 is patterned as an ITO layer on the top surface of the LCD display, and then coated with a protective coating.

Figure 4:
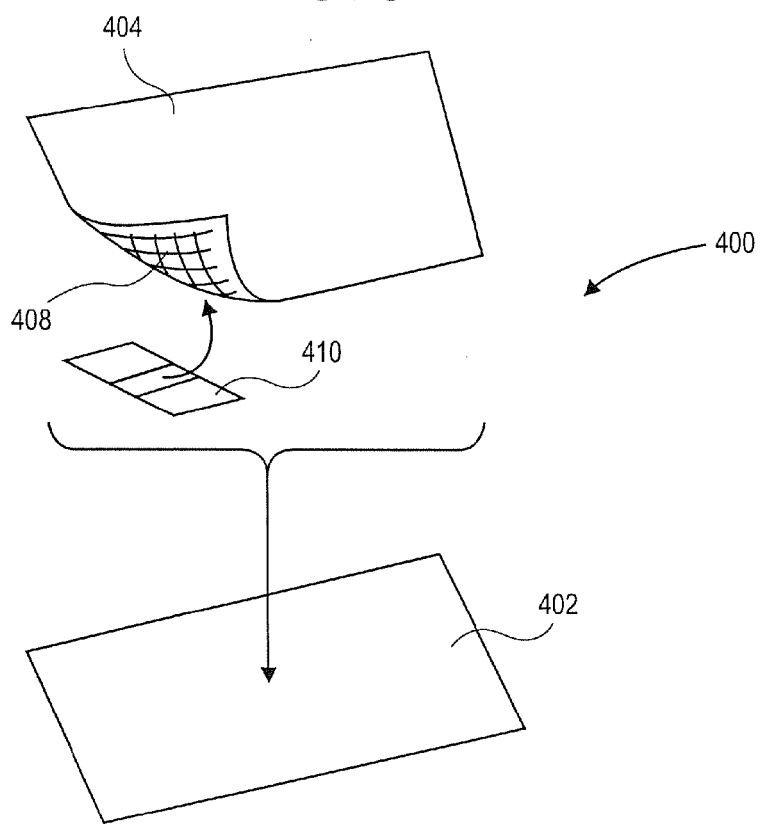
FIG. 4 illustrates an example method of assembling an LCD display device.

Referring to FIG. 4, one method of assembly 400 is illustrated. In the example of FIG. 4, a protective layer 404 has touch sensitive circuitry 408 mounted thereon, followed by a fingerprint sensor 410. Protective layer 404 (including touch sensitive circuitry 408 and fingerprint sensor 410) are then mounted on a LCD PCB 402. After assembly, touch sensitive circuitry 408 and fingerprint sensor 410 are positioned between protective layer 404 and LCD PCB 402.

Figure 5:
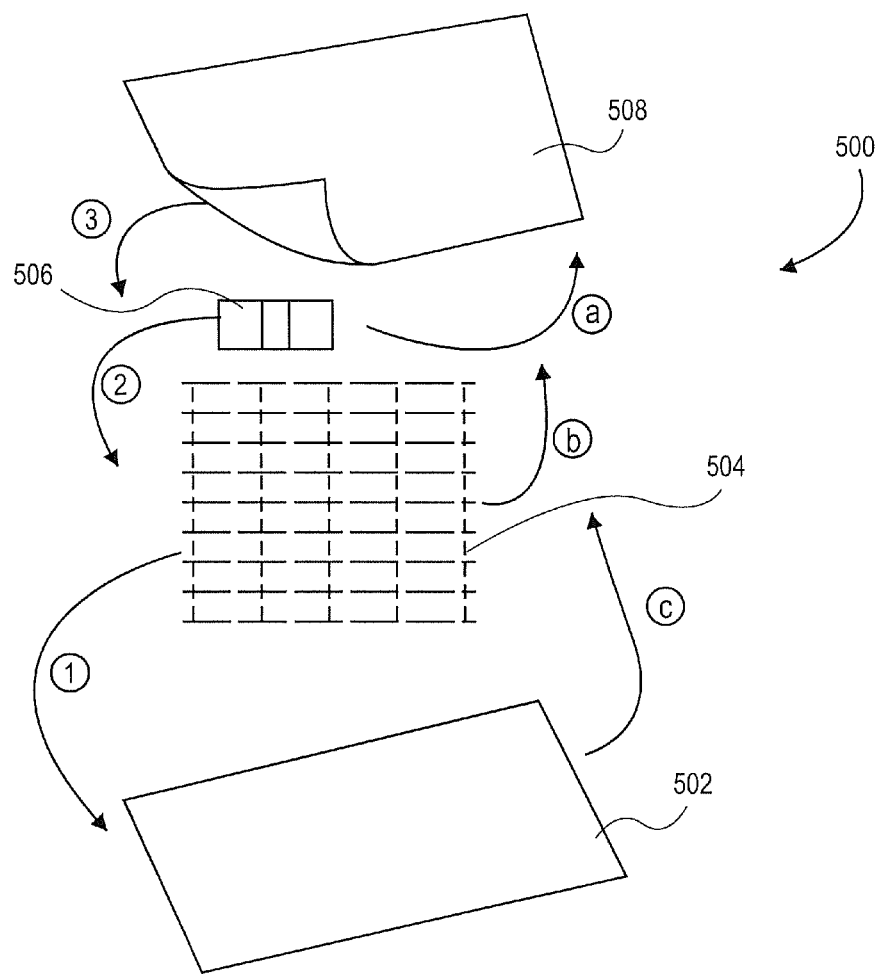
FIGS. 5-8 illustrate additional example methods of assembling an LCD display device.

Referring to FIG. 5, an expanded diagrammatic view of another example of an assembly configuration 500 is illustrated. Assembly 500 may be assembled in at least two ways as shown. In one process, a LCD PCB 502 first receives touch sensitive circuitry 504, then receives a fingerprint sensor 506, then a protective cover 508. Alternatively, fingerprint sensor 506 may first be placed or mounted on protective cover 508. The touch sensitive circuitry 504 may then be placed or mounted on protective cover 508, and the assembly can then be placed together with or mounted on LCD PCB 502.

Figure 6:
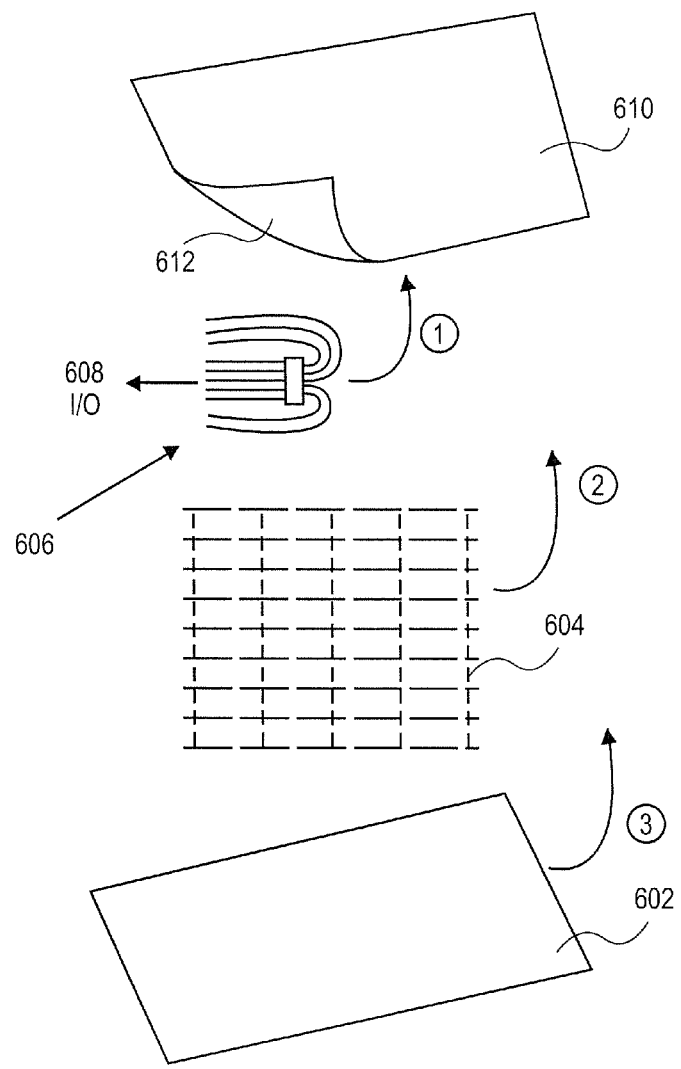

Referring to FIG. 6, an embodiment is illustrated showing fingerprint sensing circuitry 606 having I/O circuitry 608 first mounted on a surface 612 of a covering 610. Next, touch sensitive circuitry 604 is mounted on covering 610 over fingerprint sensing circuitry 606, and the assembly is then mounted on or otherwise assembled with a LCD PCB 602.

Figure 7:
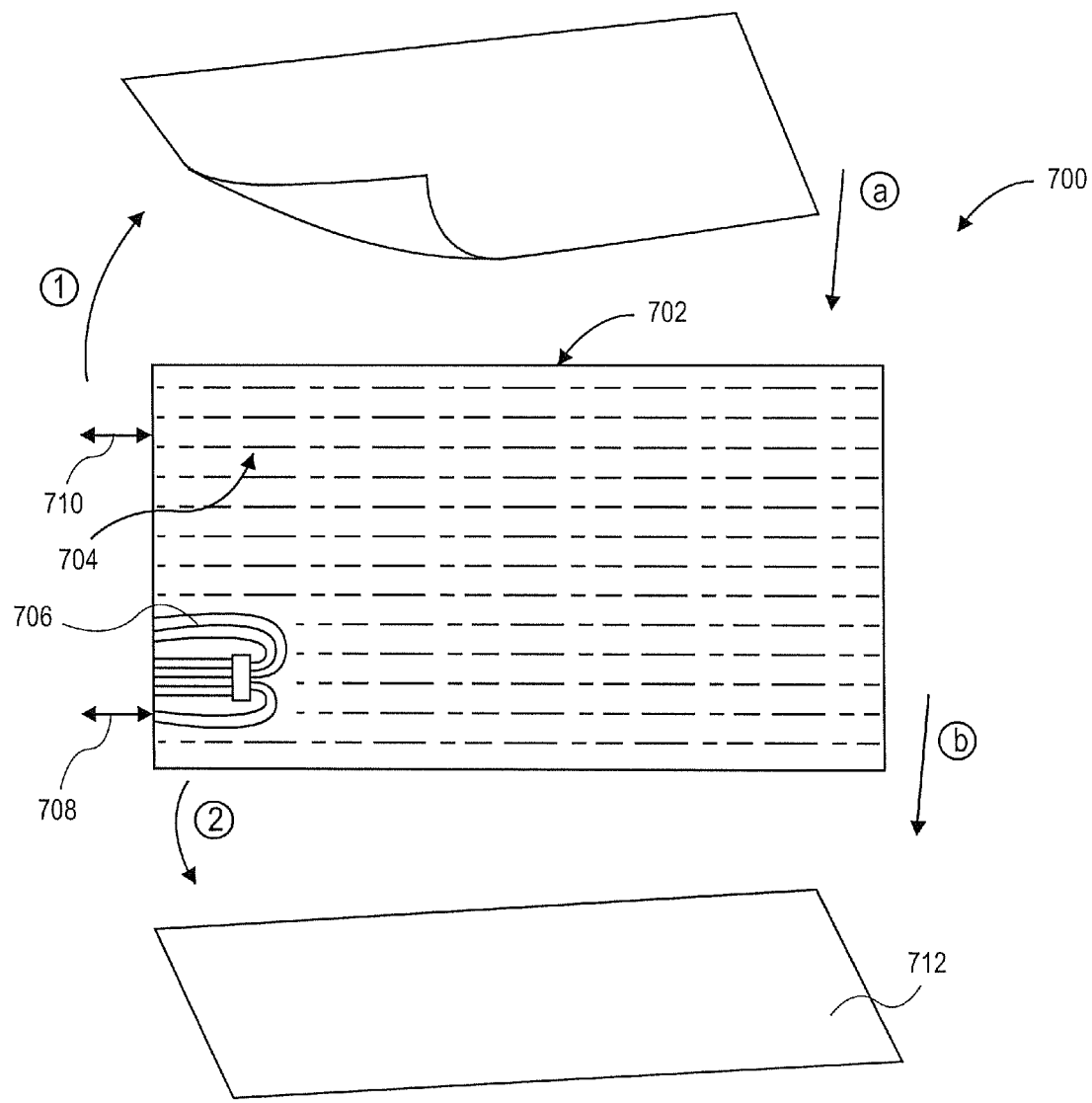

Referring to FIG. 7, yet another alternative configuration 700 is illustrated where the circuit assembly is more integrated. A circuit assembly 702 includes touch sensitive circuitry 704 together with fingerprint sensing circuitry 706 having associated I/O circuitry 708. Touch sensitive circuitry 704 also has associated I/O circuitry 710 for connecting with a processor, controller, or other device. The assembly can be mounted on either the protective covering first or a LCD PCB 712, or may be mounted simultaneously. This configuration allows for a simple integration and possibly beneficial unitary design. These layers may be configured in a variety of different orders of assembly, the foregoing and following are intended to illustrate examples of different assemblies. The integrated layer is one example and will also lend itself to an embodiment that includes a single IC (Integrated Circuit) that drives I/O circuitry 708 associated with fingerprint sensing circuitry 706 as well as I/O circuitry 710 associated with touch sensitive circuitry 704. In one embodiment, the I/O lines are all routed to a single location for a single IC to drive. The touch-screen in this case may also employ a capacitive fingerprint sensor, an RF (Radio Frequency) transmit/receive system, as well as other systems.

Figure 8:
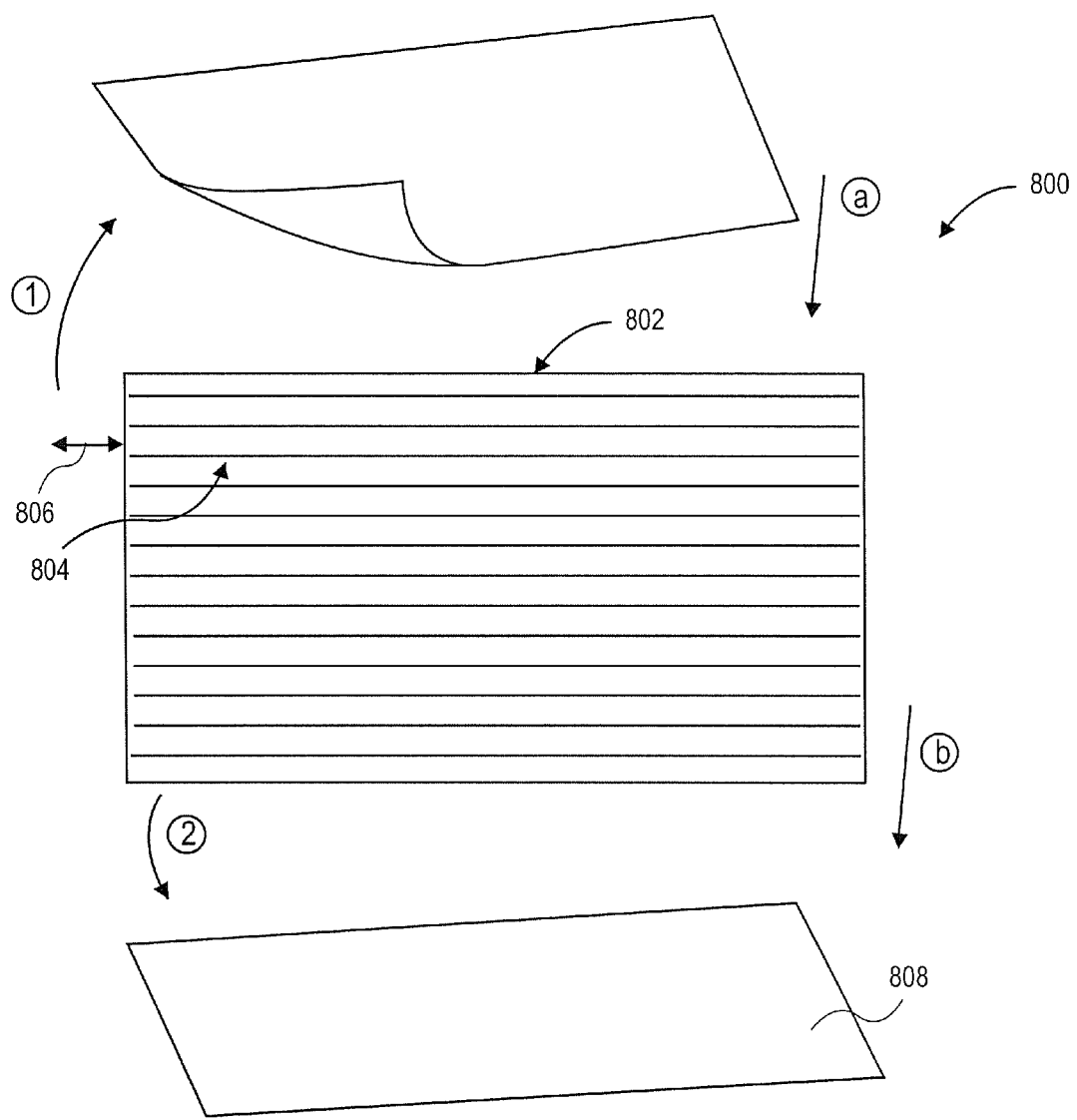
Figure 9:
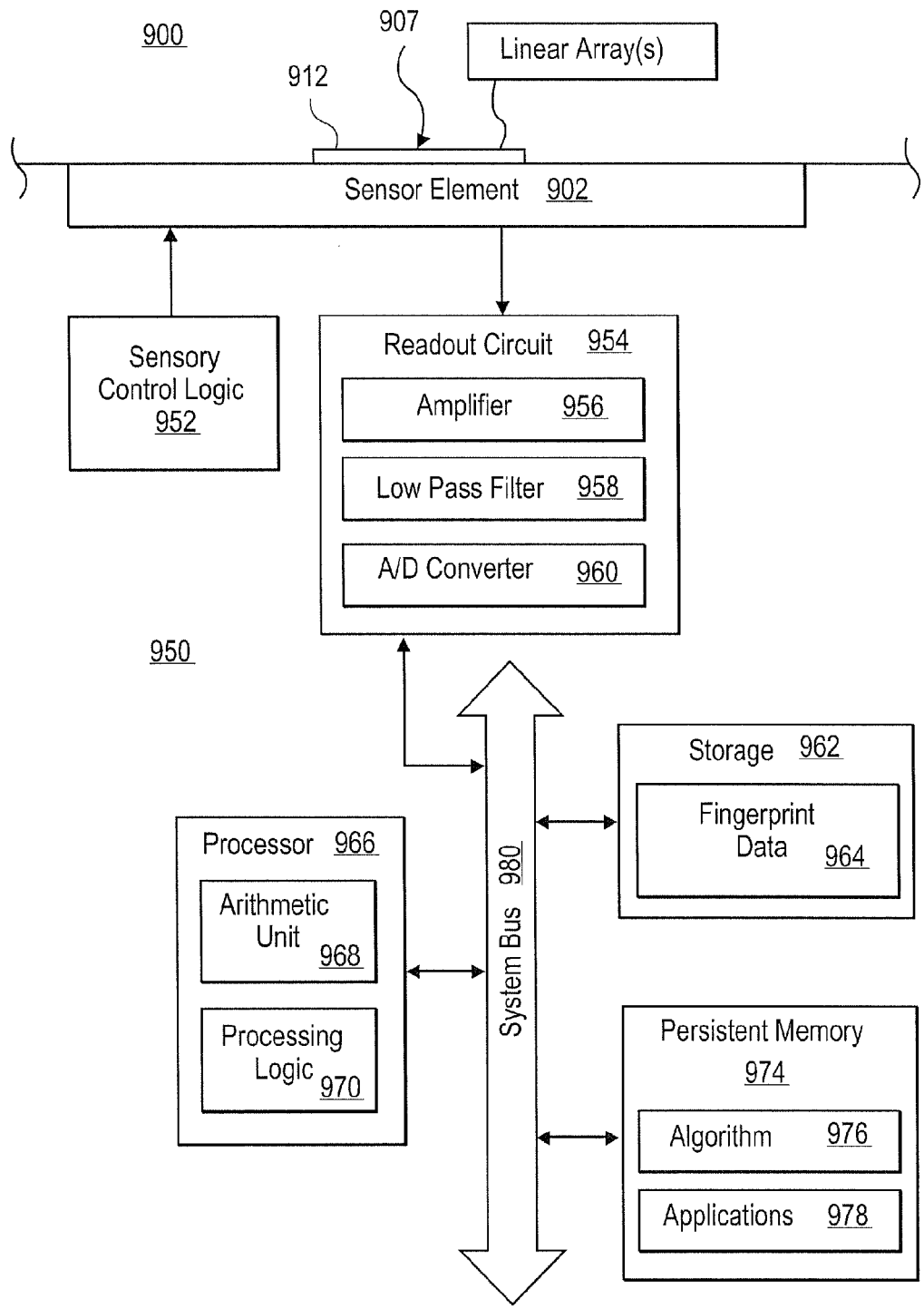
FIG. 9 illustrates an example sensing device configured for use with the fingerprint sensing circuits discussed herein.

Referring to FIG. 8, yet another alternative configuration is illustrated where a single circuit component 804 performs both fingerprint sensing and touch screen functions. Consequently, I/O of both fingerprint sensing and touch screen functions is driven by I/O circuitry 806. Circuit component 804 and I/O circuitry 806 are both included in a circuit assembly 802, which is mounted to a LCD PCB 808. A device may also be configured as single IC device and single layer of ITO metal that performs both fingerprint sensing and touch-screen sensing using technology for transmitting/receiving in a single co-planar layer.

Referring to FIG. 9, a diagrammatic view of a sensing device 900 configured according to the invention is illustrated. The device includes a linear array 912 such as described in the embodiments above, and also includes a sensor element 902. The device further includes sensor control logic 952 configured to control the basic operations of the sensor element. The exact operations of the sensor element governed by the sensor logic control greatly depends on a particular sensor configuration employed, which may include power control, reset control of the pixels or data contact points, output signal control, cooling control in the case of some optical sensors, and other basic controls of a sensor element. Sensor controls are well known by those skilled in the art, and, again, depend on the particular operation.

Sensing device 900 further includes a readout circuit 954 for reading analog output signals from sensor element 902 when it is subject to a fingerprint juxtaposed on a sensor surface 907. Readout circuit 954 includes an amplifier 956 configured to amplify the analog signal so that it can more accurately be read in subsequent operations. A low pass filter 958 is configured to filter out any noise from the analog signal so that the analog signal can be more efficiently processed. Readout circuit 954 further includes an analog to digital converter 960 that is configured to convert the output signal from sensor element 902 to a digital signal that indicates a series of logic 0's and 1's that define the sensing of the fingerprint features by the pixels or data contact points of sensor surface 907. Such signals may be separately received by the motion sensors and the fingerprint sensing surfaces, and may be read out and processed separately.

Readout circuit 954 may store the output signal in a storage 962, where fingerprint data 964 is stored and preserved, either temporarily until a processor 966 can process the signal, or for later use by the processor. Processor 966 includes an arithmetic unit 968 configured to process algorithms used for navigation of a cursor, and for reconstruction of fingerprints. Processing logic 970 is configured to process information and includes analog to digital converters, amplifiers, signal filters, logic gates (all not shown) and other logic utilized by a processor. A persistent memory 974 is used to store algorithms 976 and software applications 978 that are used by processor 966 for the various functions described above, and in more detail below. A system bus 980 is a data bus configured to enable communication among the various components contained in sensing device 900.

In assembly, there are various ways such a device can be configured. In one embodiment, a fingerprint sensor is provided that includes a flexible substrate having fingerprint sensor lines on one surface and configured to be integrated with an LCD screen. This allows for a device such as a laptop, cellular phone, touch-screen interface, or other personal device to have an integrated fingerprint sensor, saving space and simplifying the integrated design.

In another embodiment, the fingerprint sensor may be mounted on the LCD PCB separate from the touch screen circuitry. The touch screen circuitry may be mounted on the protective shield or coating. The resulting structure can then be mounted on the LCD PCB. This also provides an LCD screen with both touch screen circuitry and fingerprint sensor circuitry integrated therein.

In another embodiment, the fingerprint sensor may be mounted on the protective coating or shield along with the touch screen circuitry. The resulting structure can then be mounted on the LCD PCB. This gives an LCD screen with both touch screen circuitry and fingerprint sensor circuitry integrated therein.

In yet another embodiment, the substrate is obviated by the protective coating. The protective coating is configured to hold touch screen circuitry together with the fingerprint sensor lines mounted on the protective coating or shield. Here, the protective coating can be mounted on an LCD screen together with the touch screen circuitry and the fingerprint sensor lines. In yet another combination, the touch screen circuitry can be mounted directly on the LCD PCB, the fingerprint sensor lines mounted on the protective coating or shield, and the two resulting structures can be mounted together to produce an LCD display having both touch screen and fingerprint sensor functionality.

The resulting system is an LCD screen having an integrated fingerprint swipe sensor and, possibly, a touch screen. The LCD screen may have one or the other or both, depending on the application. The system includes an LCD surface configured to produce a visible display. On top of the LCD surface can be mounted touch screen circuitry that may include fingerprint sensor lines. Alternatively, a separate substrate holding the fingerprint sensor lines may be mounted on or below the touch screen circuitry. In either configuration, the resulting structure may be configured to be integrated with the LCD screen to allow the integrated fingerprint sensor lines to capture a fingerprint image without interfering with the visibility of the display or with the function of the touch screen operation.

The system further includes a controller communicating with the fingerprint sensor lines to capture a fingerprint image when a user's fingerprint is swiped about the fingerprint sensor lines. In one system, there may be separate controllers for both the LCD display and the fingerprint sensor, where the system includes an LCD controller configured to control the visible display separate from the fingerprint sensor operations. Alternatively, the same controller may also control both the visible display and the fingerprint sensor operations. The fingerprint sensor could also be patterned onto the top glass of the LCD display itself, and not onto the touch-screen layer.

Figure 10:
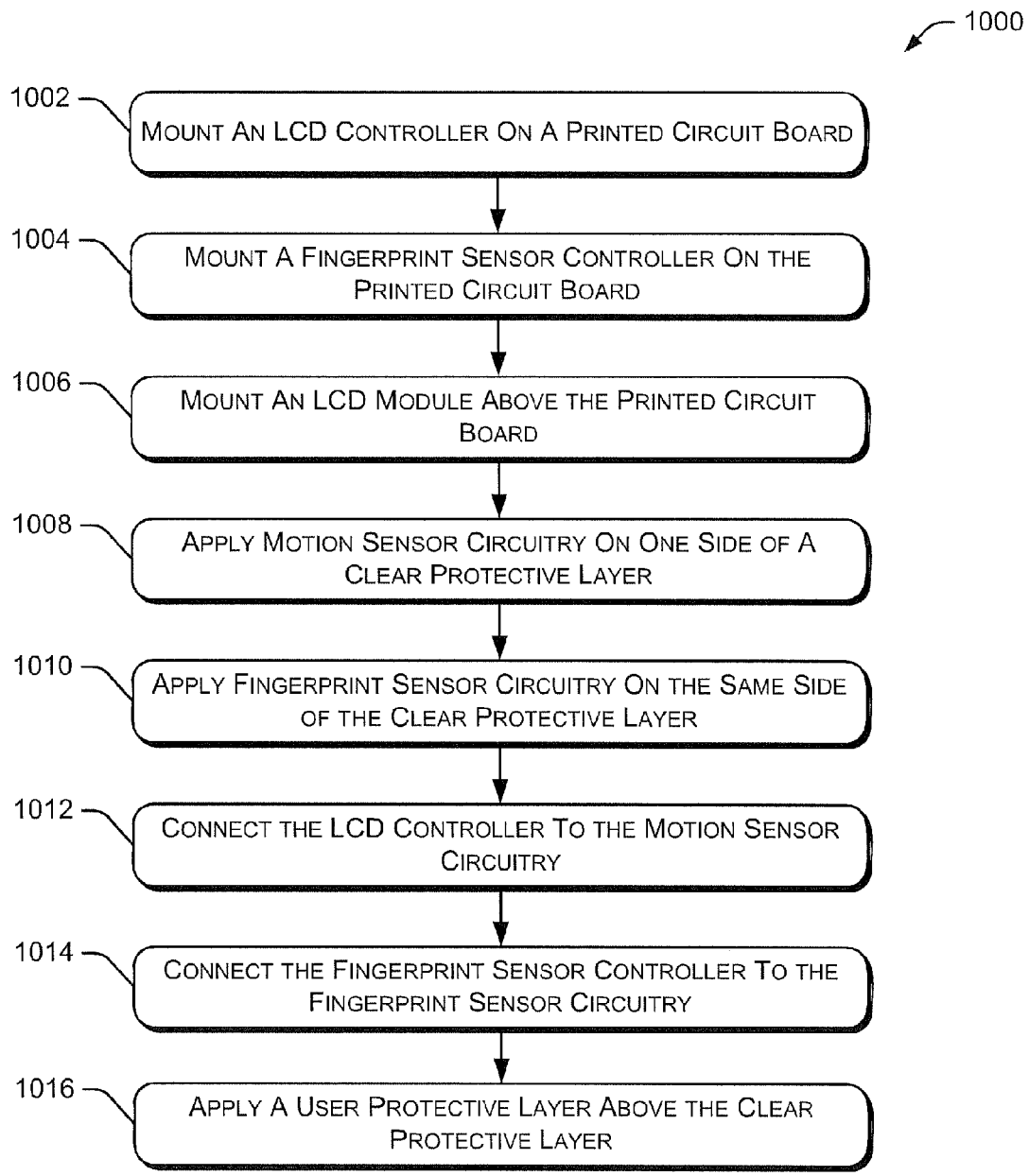
FIG. 10 is a flow diagram illustrating an embodiment of a procedure for assembling an LCD display device.

FIG. 10 is a flow diagram illustrating an embodiment of a procedure 1000 for assembling an LCD display device. Initially, an LCD controller is mounted on a printed circuit board (block 1002) and a fingerprint sensor controller is mounted on the same printed circuit board (block 1004). An LCD module is mounted above the printed circuit board (block 1006). Motion sensor circuitry is applied on one side of a clear protective layer (block 1008) and fingerprint sensor circuitry is applied to the same side of the clear protective layer (block 1010). The LCD controller is then connected to the motion sensor circuitry (block 1012) and the fingerprint sensor controller is connected to the fingerprint sensor circuitry (block 1014). Finally, a user protective layer is applied above the clear protective layer to protect the assembly (block 1016).

Figure 11:
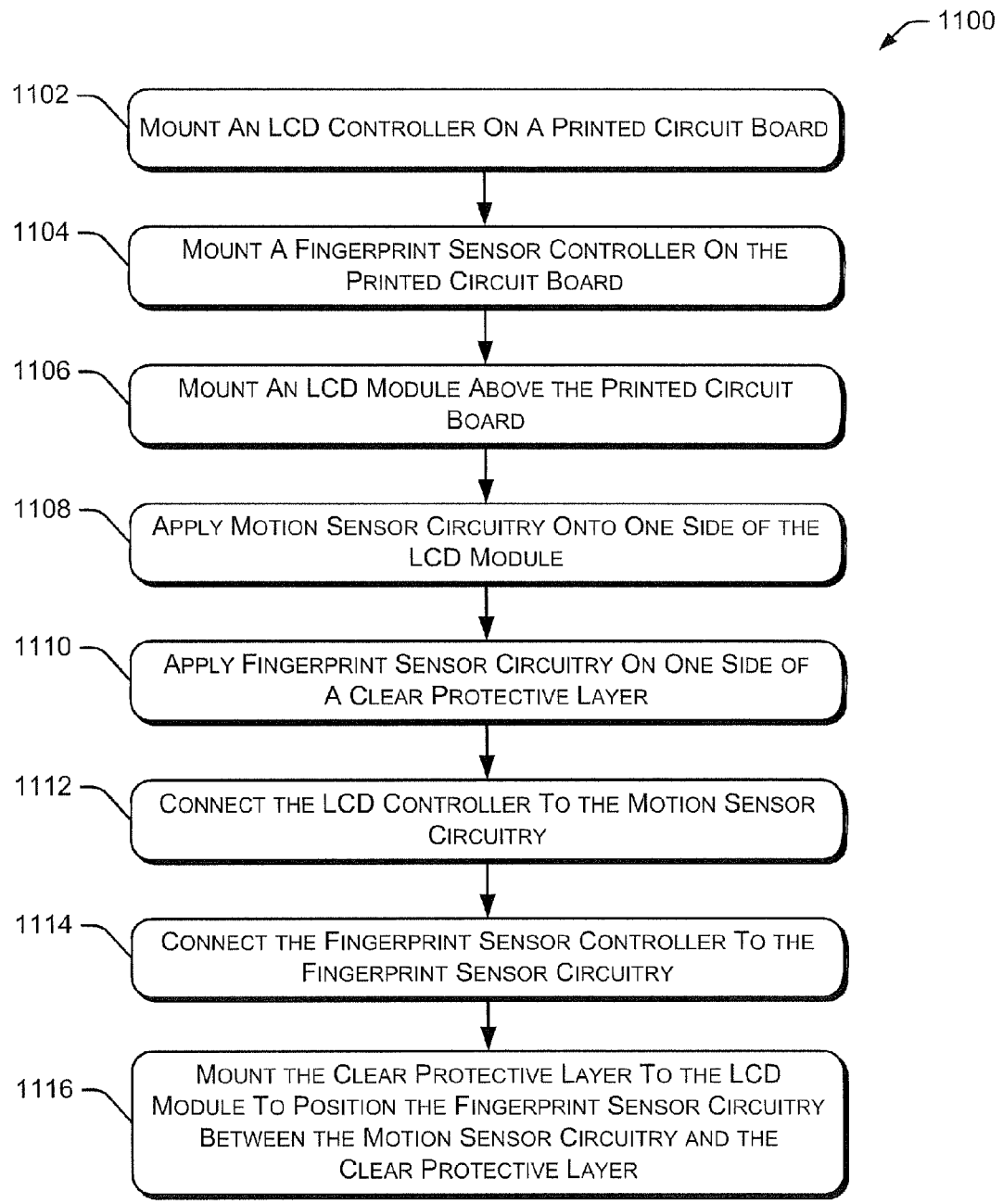
FIG. 11 is a flow diagram illustrating another embodiment of a procedure for assembling an LCD display device.

FIG. 11 is a flow diagram illustrating another embodiment of a procedure 1100 for assembling an LCD display device. Initially, an LCD controller is mounted on a printed circuit board (block 1102) and a fingerprint sensor controller is mounted on the same printed circuit board (block 1104). An LCD module is mounted above the printed circuit board (block 1106). Motion sensor circuitry is applied on one side of the LCD module (block 1108) and fingerprint sensor circuitry is applied on one side of a clear protective layer (block 1110). The LCD controller is then connected to the motion sensor circuitry (block 1112) and the fingerprint sensor controller is connected to the fingerprint sensor circuitry (block 1114). Finally, the clear protective layer is mounted to the LCD module to position the fingerprint sensor circuitry between the motion sensor circuitry and the clear protective layer (block 1116).

The present invention may also involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the invention. The machine-readable medium includes any mechanism that provides (i.e., stores and/or transmits) information in a form readable by a machine (e.g., a computer, PDA, cellular telephone, etc.). For example, a machine-readable medium includes memory (such as described above); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

Embodiments of the systems and methods described herein facilitate integrated fingerprint sensing and display of information. Some embodiments are used in conjunction with one or more conventional fingerprint sensing systems and methods. For example, one embodiment is used as an improvement of existing fingerprint detection and/or sensing systems. Other embodiments are used in conjunction with one or more conventional display systems and methods. For example, one embodiment is used as an improvement of existing display devices.

Although the components and modules illustrated herein are shown and described in a particular arrangement, the arrangement of components and modules may be altered to sense fingerprint information or to display information in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A touch screen display device having integrated touch sensing and biometric image capture capabilities, comprising:
   a top layer, comprising a display protective glass layer;
   a lower layer;
   touch sensitive circuitry disposed intermediate the top layer and the lower layer, the touch sensitive circuitry being configured to detect touch input; and
   a biometric object image sensor disposed intermediate the top layer and the lower layer, the biometric object image sensor comprising electrode traces forming an array of capacitive gap sensing elements, wherein the array includes at least one image pixel location defined by a capacitive coupling gap between a respective signal drive trace and a respective signal pickup trace to capture a biometric object image when a biometric object of a user is above the biometric object image sensor and the display protective glass layer.

2. The touch screen display device according to claim 1, wherein the capacitive gap sensing elements are made of a substantially transparent conductive material.

3. The touch screen display device according to claim 1, wherein the capacitive gap sensing elements are made of indium tin oxide.

4. A Liquid Crystal Display (LCD) screen having integrated touch sensing and biometric object image capture capabilities, the LCD screen comprising:
   an LCD module configured to produce a visible display;
   a protective layer located above the LCD module;
   touch sensitive circuitry located intermediate the LCD module and the protective layer, the touch sensitive circuitry being configured to detect touch input; and
   a biometric object image sensor disposed intermediate the LCD module and the protective layer, the biometric object image sensor comprising electrode traces forming an array of capacitive gap sensing elements, wherein the array includes at least one image pixel location defined by a capacitive coupling gap between a respective signal drive trace and a respective signal pickup trace to capture a biometric object image when a biometric object of a user is above the biometric object image sensor.

5. The LCD screen according to claim 4, further comprising an LCD controller coupled to the LCD module and configured to control the visible display of the LCD module.

6. The LCD screen according to claim 5, wherein the LCD controller is further coupled to the biometric object image sensor and further configured to control the biometric object image sensor.

7. The LCD screen according to claim 4, wherein the touch sensitive circuitry is integrated with the biometric object image sensor.

8. The LCD screen according to claim 4, wherein the capacitive gap sensing elements are made of a substantially transparent conductive material.

9. The LCD screen according to claim 4, wherein the capacitive gap sensing elements are made of indium tin oxide.

10. A method of assembling a Liquid Crystal Display (LCD) display device having touch sensitive circuitry and a biometric object image sensor, the method comprising:
    providing a printed circuit board;
    mounting an LCD module above the printed circuit board;
    mounting an LCD controller on one of the LCD module and the printed circuit board;
    covering the LCD module with a protective layer;
    placing the touch sensitive circuitry intermediate the protective layer and the LCD module; and
    placing the biometric object image sensor intermediate the protective layer and the LCD module, the biometric object image sensor comprising electrode traces forming an array of capacitive gap sensing elements, wherein the array includes at least one image pixel location defined by a capacitive coupling gap between a respective signal drive trace and a respective signal pickup trace.

11. The method according to claim 10, further comprising coating the protective layer with a user protective coating.

12. The method according to claim 10, wherein the LCD controller is configured to control the touch sensitive circuitry and the biometric object image sensor.

13. The method according to claim 12, further comprising connecting the LCD controller to the touch sensitive circuitry and the biometric object image sensor.

14. The method according to claim 10, further comprising mounting a biometric object image sensor controller on the printed circuit board.

15. The method according to claim 14, further comprising connecting the LCD controller to the touch sensitive circuitry and connecting the biometric object image sensor controller to the biometric object image sensor.

16. The method according to claim 10, wherein the capacitive gap sensing elements are made of a substantially transparent conductive material.

17. A method of assembling a Liquid Crystal Display (LCD) display device having touch sensitive circuitry and a biometric object image sensor, the method comprising:
    providing a printed circuit board;
    mounting an LCD module above the printed circuit board;
    mounting an LCD controller on one of the LCD module and the printed circuit board;
    placing the touch sensitive circuitry intermediate the printed circuit board and the LCD module;
    mounting a protective layer to the LCD module; and
    placing the biometric object image sensor on an outer surface of the protective layer such that the protective layer is located between the touch sensitive circuitry and the biometric object image sensor, the biometric object image sensor comprising electrode traces forming an array of capacitive gap sensing elements, wherein the array includes at least one image pixel location defined by a capacitive coupling gap between a respective signal drive trace and a respective signal pickup trace.

18. The method according to claim 17, wherein the LCD controller is configured to control the touch sensitive circuitry and the biometric object image sensor.

19. The method according to claim 17, further comprising mounting a biometric object image sensor controller on the printed circuit board.

20. The method according to claim 19, further comprising connecting the LCD controller to the touch sensitive circuitry and connecting the biometric object image sensor controller to the biometric object image sensor.

21. The method according to claim 17, wherein the capacitive gap sensing elements are made of a substantially transparent conductive material.

22. The touch screen display device of claim 1, wherein the biometric object image sensor comprises a fingerprint image sensor.

23. The LCD screen of claim 4, wherein the biometric object image sensor comprises a fingerprint image sensor.

24. The method of claim 10, wherein the biometric object image sensor comprises a fingerprint image sensor.

25. The method of claim 17, wherein the biometric object image sensor comprises a fingerprint image sensor.

\* \* \* \* \*